Figure 1:
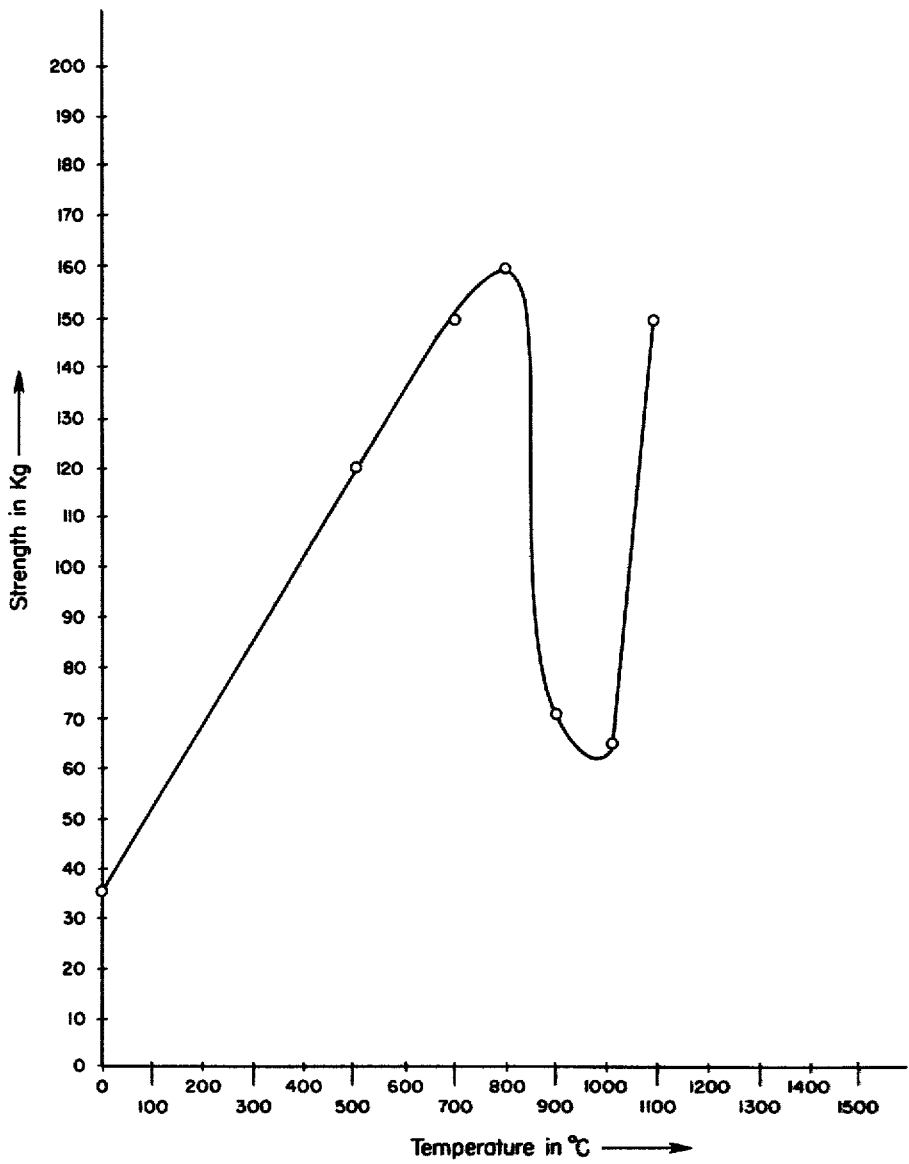
Figure 2:
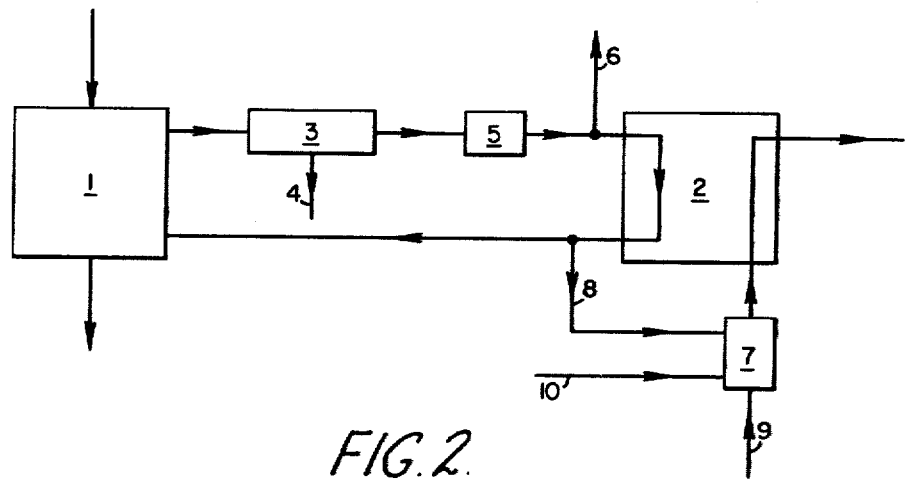
Figure 3:
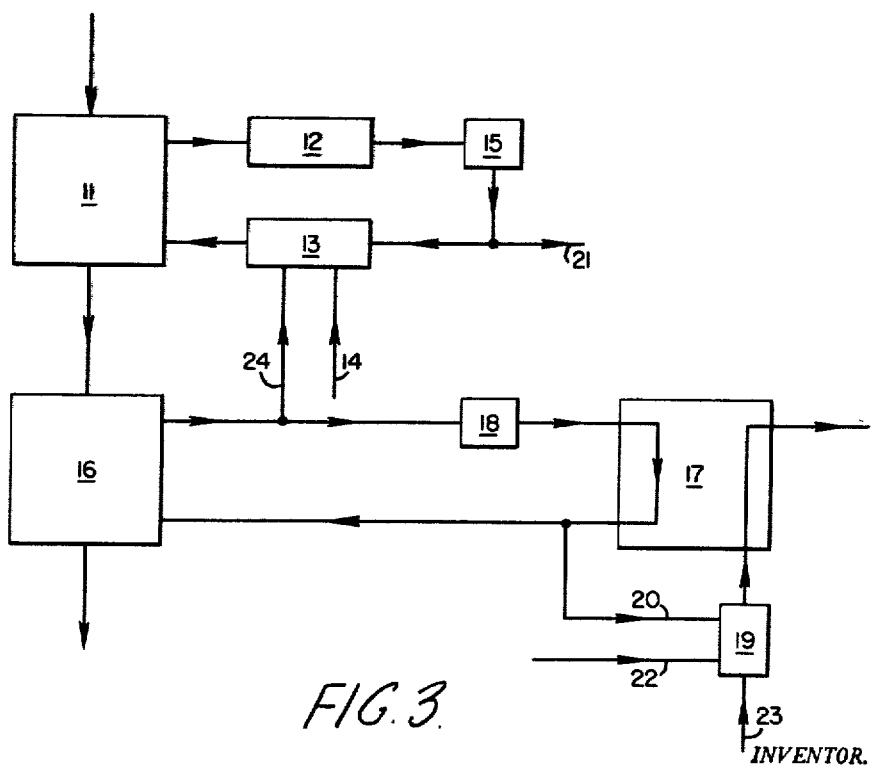

INVENTOR.
FREDRIK CHRISTEN COLLIN

United States Patent Office 3,093,474
Patented June 11, 1963

3,093,474
PROCESS OF REDUCING METAL OXIDES
Fredrik Christen Collin, Ljan, Oslo, Norway, assignor to Elektrokemisk A/S, Oslo, Norway, a corporation of Norway
Filed Feb. 16, 1960, Ser. No. 9,053
Claims priority, application Norway Feb. 20, 1959
3 Claims. (Cl. 75—33)

It is known to produce moulded bodies like briquettes and pellets from pulverulent materials comprising one or more of the components constituting the raw materials for production of metal, sponge metal or carbide from metal oxides. The moulded bodies thus contain finely divided oxide and carbonacious reducing agent in intimate contact which is very favourable for a dry reduction below the melting points of the charge and reaction product.

It has been proposed to heat and reduce such moulded bodies by combusting the CO-gas formed during the reduction with air and thereby cover the demand for heat in the reduction process. In spite of the fact that this process has been known for a long time it has hitherto not found commercial use. This is probably due to the fact that one has not succeeded in finding suitable process and equipment for carrying out the process on a technical scale.

It has further been proposed to heat briquettes or pellets in a shaft furnace where air is injected for combustion of the reaction gas formed by reduction of the metal oxides. This presents, however, considerable operational difficulties as one operates within a comparatively narrow temperature interval and the temperature control is a great problem. Another proposal is to treat charge briquettes in rotary kiln where the briquettes are heated by combustion above the charge level of CO with gases supplied for the combustion. In the productions in question large and expensive rotary kiln plants will be required. Furthermore, the treatment in a rotary kiln means a great mechanical strain on briquettes and pellets so that these will easily disintegrate in the kiln.

An interesting proposal for processing of charge briquettes consisting of iron ore and raw coal implies sintering the pellets on a sintering machine and passing air through the bed of pellets so that a combined pre-reduction and agglomeration or a reducing sintering is attained. This means, however, a very great consumption of carbon, corresponding to 1 ton of raw coal per ton pig iron.

Applicant has during the later years run through tests on laboratory and semi technical scale with pig iron charge in briquetted and pelletized form. These tests have confirmed that it is possible to carry out an effective dry reduction in the temperature interval 900–1050° C. with heat supply from combustion of the reaction gas. However, the process presents very serious problems as disintegration of the moulded bodies during the treatment, direct and indirect loss of carbon on account of combustion of carbon in the surface layer of the moulded bodies, and reoxidizing of reduced iron. Our invention has for its object to solve these problems.

In the production of charge pellets there is, as known, used a finely ground mixture of the charge components to which is added about 10% water. The mixture is rolled to balls on a pelletizing saucer or in a drum. A ball size of about 20–25 millimeter diameter is is easily produced and is also well adapted for the further treatment. The raw balls fom the pelletizing saucer should stand a point load of 3–5 kilos or more to permit handling and transport for further treatment. The raw balls are as a rule so weak that they are not suited for reduction, and they should therefore be subjected to a hardening process by storing and/or drying, so that their strength by point load is increased to minimum 10–20 kilos.

Applicant has examined practically all binding agents and additions for agglomeration which during later years have been mentioned in the literature and has found that a combination of strongly baking coal as a reducing agent and a rapidly binding Portland cement will give pellets with mechanical qualities of exceptionally high class. The appended FIG. I shows a graphical illustration of point load strength of pellets with about 20 millimeters' diameter which had been heated from room temperature to 1100° C. in a laboratory scale rotary kiln. The temperature is reported as abscissa and the point load strength as ordinate. The raw pellets have been hardened by storing for two to seven days. Already after two days storage the point load strength is about 15 kilos. Upon drying the load strength is further improved to about 35 kilos and will then increase linearly to about 160 kilos when gradually heated to 800° C. This point load strength corresponds with what is required for, for example sintered pellets produced from concentrated taconite in the big American plants. Between 800 and 900° C. the reduction of iron oxide begins and the load strength is rapidly reduced, probably because the coke reinforcement formed by the baking coil is gradually consumed. Furthermore, the balls become more porous because the reduced iron particles have a smaller volume than the iron oxide. Even after reduction at about 1000° C. the load required for fracturing of a single ball will be more than 60 kilos and this is satisfactory for treatment of the balls in a shaft furnace. A further increase in temperature above 1000–1100° C. will again increase the load strength on account of increasing sintering. In this temperature interval the ball surface will, however, soften which will cause hanging in shaft furnaces.

To counteract oxidation of carbon and reoxidizing of iron during the heating of pellets there is according to the invention utilized a heating system which is based on a recirculation of the reaction gases. In the reduction of pellets containing iron oxide in the temperature interval 950–1000° C. where the reaction proceeds very rapidly, the reaction gas will contain about 27% $CO_2$ and 73% CO corresponding to the equilibrium of the reaction:

$$FeO+CO=Fe+CO_2$$

This reaction gas which is in equilibrium with the reduced iron on the surface of the balls will not have any oxidizing effect on the iron and can without risk of detrimental reoxidation be used as circulating and heat carrying heating medium. According to the invention this reaction gas is heated indirectly, that is in a closed system in a heat exchanger without contact with air and without being diluted with gases which make the circulating gas oxidizing towards metallic iron. The necessary number of calories is supplied by means of combustion of excess reaction gas, if desired with addition of another fuel.

FIGS. II and III give alternative examples of flow sheets when using the invention for reduction of metal oxide agglomerated together with bituminous raw coal and a binding agent which gives sufficient strength for the raw briquettes, for example Portland cement.

On the flow sheet FIG. II, 1 is a reduction furnace which can be a simple vertical shaft furnace where charge pellets are added on the top and discharged at the bottom of the furnace through lock-arrangements. Near the bottom of the furnace is introduced the circulation gas which is heated to about 1100° C. in the heat exchanger 2. The gas flows upwards in the furnace in counter current to the briquettes. In the lowest part of the furnace a reduction of the iron oxide takes place, the heat requirement for the endothermic reactions being covered by the heat content of the circulation gas. By the reaction in the briquettes themselves CO combines with the oxygen of the metal oxide to form $CO_2$ which again reacts with carbon in the pellets whereby CO is regenerated. In the iron oxide reduction there will, as mentioned above, be formed a gas in the pellets which contains about 27% $CO_2$ and 73% CO, which increases the volume of gas in the reduction furnace.

In the upper part of the reduction furnace a carbonization of the raw coal takes place which produces a mechanically strong reinforcement of reactive coke in the pellets, while the volatile hydrocarbons are expelled. To avoid condensation of these hydrocarbons in the upper part of the shaft the exhaust gas temperature is maintained at minimum 300° C. According to FIG. II the gases are cooled and cleaned in a usual gas cleaning apparatus 3, where dust and tar are separated out as indicated by the arrow 4, whereupon the gas by means of a fan 5 is forced through the heat exchanger 2. Excess of gas is taken out between the fan and the heat exchanger as indicated by the arrow 6. In the heat exchanger the gas is heated to about 1100° C. and returned to the reduction furnace. A part of the gas produced is led into a combustion chamber 7, as indicated by arrow 8 and burnt with air (arrow 9) to give the necessary supply of heat for heating the circulation gas in the heat exchanger. If desired, additional gas is supplied to the burner as indicated by the arrow 10.

If reaction gas from the reduction furnace is led directly to the heat exchanger without cooling and condensation of the hydrocarbons expelled from the raw coal, there may be obtained a decomposition of the hydrocarbons which react with $CO_2$ and $H_2O$ to $CO+H_2$.

FIG. III shows a flow sheet where the treatment of the raw pellets is carried out in two steps. First step takes place in the drying and pre-heating furnace 11 where the pellets are dried and preheated and the raw coal carbonized. If the pellets do not contain raw coal it is sufficient to bring the temperature up to about 200° C. to dry and harden the briquettes. But if the pellets contain raw coal a temperature of 400–600° C. possibly up to 900° C. is used in the furnace for the first treatment, so that the tar constituents of the charge are expelled. The gases containing tar fumes are washed and cleaned in the gas cleaning apparatus 12 and a part of these gases are then used to dilute the CO-rich gas which is combusted in a combustion chamber 13 from where the hot gases are led into the drying and preheating furnace. The combustion chamber is supplied with air as indicated by the arrow 14. The gases from the gas cleaning apparatus are forced into the combustion chamber by means of the fan 15. The preheated pellets are through locks introduced into the reduction furnace 16 which is heated by means of circulation gas from the heat exchanger 17 as described above. 18 is a fan and 19 is the combustion chamber for the heat exchanger where a part of the gas produced in the reduction furnace 16 is burned. This gas is led into the burner as indicated by the arrow 20. As the volatile hydrocarbons have previously been expelled it is no longer necessary to wash and cool the gases. If the gases contain dust they can be cleaned in a cyclone or the like and without intentional cooling be pumped through the heat exchanger back into the reduction furnace by means of a high temperature fan. The excess gas is taken out from the system as indicated by the arrow 21, while additional gas and air is supplied to the burner 19 as indicated by the arrows 22 and 23.

CO-gas from the circulation system for the reduction furnace can be transferred to the combustion chamber 13 as additional fuel as indicated by the arrow 24.

As heat exchanger one can use any known design, for example the discontinuously operating "Cowpers" which have been developed in the iron industry for preheating the blast for blast furnaces. One can also use a continuously operating heat exchanger where the gas is heated in tubes of heat resisting steel or a heat exchanger built of ceramic material. Packed towers filled with ceramic balls, the so-called "pebble-heaters" can be operated with a continuous flow of balls and are well suited for the purpose.

The invention gives a good solution of the production of iron from fine grained ores and ore concentrates which are suitable for transformation into briquettes or pellets. The production of such moulded bodies only require a simple and relatively cheap equipment. The treatment of the moulded bodies in a flow of circulating reaction gases can advantageously be carried out in simple shaft furnaces of well known design. The heat exchange between the circulating heating gas and the pellets is very rapid and effective and pellets of even size give an open and porous packing with small loss of pressure. The invention therefore makes it possible to use a robust, simple and compact apparatus.

The degree of reduction of the metal oxide in the moulded bodies is determined by their content of carbon, the reaction temperature, amount of heat supplied by the circulating gas and their retention time in the reduction furnace. The process can be so run that a partial reduction is attained while the final reduction is accomplished in another furnace, preferably by transferring the moulded bodies directly or in closed and insulated containers so that reoxidation and cooling is avoided. The heat content of the reduced moulded bodies will thus also be utilized.

The partially reduced moulded bodies can thus be finally reduced and smelted in an electric furnace, blast furnace or other known types of furnace for production of iron and metals. By controlling the reduction so that the greater part of the metal oxides is reduced to metal, a metal sponge for sale can be produced if the product is cooled without access of air or ozidizing gases.

The invention can be used for partial reduction, so-called pre-reduction, of iron ore and other oxidic ores of those metals whose oxides can be reduced with CO in solid phase without melting.

The invention is not limited to the heating of charge pellets in a shaft furnace. Other furnace types, for example furnaces provided with travelling grates (sinter band) can be used. The process can also be carried out by fluidizing of 1 to 10 millimeter pellets.

What I claim is:

1. The process of preheating and reducing iron oxide ores in a furnace by direct reduction of the oxide with a solid carbonaceous reducing while recycling the reaction gases generated by and in equilibrium with the reduction reaction in order to control the atmosphere in the furnace and thereby minimize oxidation of carbon and reoxidation of reduced iron which comprises the steps of forming molded aggregates of the iron oxide ore in finely divided form together with a solid carbonaceous reducing agent, charging the aggregates to the furnace, heating the aggregates to a temperature of from about 800° C. to about 1100° C. to reduce the iron oxide by reaction with the carbonaceous reducing agent and simultaneously generate reaction gas in equilibrium with such reaction and consisting essentially of CO in major proportion and $CO_2$ in minor proportion, withdrawing the reaction gas from the furnace, dividing out a portion of the reaction gases and burning the divided out portion in a heating zone, passing the remainder of the reaction gas through the heating zone to indirectly heat the same without contacting the products of combustion, returning the heated reaction gas to the furnace substantially in the equilibrium proportions of CO and $CO_2$ that it was generated, and controlling the combustion of the divided out portion of reaction gas in the heating zone by burning additional fuel if necessary to indirectly heat the reaction gass that is to be recycled to that temperature required for heating the aggregates to the specified temperatures of reduction.

2. The process specified in claim 1 which includes the step of recycling the reaction gas in a closed system to prevent any change in composition of such reaction gas other than that caused by dividing out the said portion of such gas.

3. The process specified in claim 1 in which the reaction gas contains CO and $CO_2$ approximately in the proportion of 73% CO and 27% $CO_2$.

References Cited in the file of this patent

UNITED STATES PATENTS

| | | |
|---|---|---|
| 1,815,899 | Brassert | July 28, 1931 |
| 1,848,710 | Gustafsson | Mar. 8, 1932 |
| 1,864,593 | Gustafsson | June 28, 1932 |
| 1,937,822 | Jones | Dec. 5, 1933 |
| 1,984,727 | Brown | Dec. 18, 1938 |
| 2,107,549 | Schmalfeldt | Feb. 8, 1938 |
| 2,142,100 | Avery | Jan. 3, 1939 |
| 2,500,553 | Lykken | Mar. 14, 1950 |
| 2,547,685 | Brassert et al. | Apr. 3, 1951 |
| 2,609,288 | Stuart | Sept. 2, 1952 |

UNITED STATES PATENT OFFICE
CERTIFICATE OF CORRECTION

Patent No. 3,093,474　　　　　　　　　　　　　　June 11, 1963

Fredrik Christen Collin

It is hereby certified that error appears in the above numbered patent requiring correction and that the said Letters Patent should read as corrected below.

Column 4, line 68, after "reducing" insert -- agent --.

Signed and sealed this 7th day of January 1964.

(SEAL)
Attest:

ERNEST W. SWIDER

Attesting Officer

EDWIN L. REYNOLDS

Acting　Commissioner of Patents